(12) United States Patent
Buckle

(10) Patent No.: US 6,868,499 B1
(45) Date of Patent: Mar. 15, 2005

(54) METHOD AND APPARATUS FOR PASSWORD RE-ENTRY

(75) Inventor: John Buckle, Singapore (SG)

(73) Assignee: Sun Microsystems, Inc., Palo Alto, CA (US)

(*) Notice: Subject to any disclaimer, the term of this patent is extended or adjusted under 35 U.S.C. 154(b) by 806 days.

(21) Appl. No.: 09/589,787

(22) Filed: Jun. 8, 2000

(51) Int. Cl.$^7$ .............................. G09G 5/22; H04L 9/32
(52) U.S. Cl. ....................... 713/202; 345/741; 345/742; 713/201
(58) Field of Search ................................ 713/202, 183, 713/200, 201; 345/741, 742, 743

(56) References Cited

U.S. PATENT DOCUMENTS

| | | | | |
|---|---|---|---|---|
| 1,657,411 A | * | 1/1928 | Scherbius ..................... | 380/52 |
| 5,884,312 A | * | 3/1999 | Dustan et al. ................ | 707/10 |
| 5,892,905 A | * | 4/1999 | Brandt et al. ............... | 713/201 |
| 5,900,004 A | * | 5/1999 | Gipson ....................... | 715/530 |
| 6,000,033 A | * | 12/1999 | Kelley et al. ............... | 713/201 |
| 6,125,352 A | * | 9/2000 | Franklin et al. ............. | 705/26 |
| 6,134,661 A | * | 10/2000 | Topp .......................... | 713/200 |
| 6,141,760 A | * | 10/2000 | Abadi et al. ................ | 713/202 |
| 6,173,402 B1 | * | 1/2001 | Chapman .................... | 713/182 |
| 6,243,816 B1 | * | 6/2001 | Fang et al. .................. | 713/202 |
| 6,687,836 B1 | * | 2/2004 | Butler ........................ | 713/202 |

FOREIGN PATENT DOCUMENTS

JP          09081521 A    *    3/1997    ........... G06F/15/00

* cited by examiner

*Primary Examiner*—Gregory Morse
*Assistant Examiner*—Matthew Heneghan
(74) *Attorney, Agent, or Firm*—Peter J. Meza; William J. Kubida; Hogan & Hartson LLP

(57) ABSTRACT

The present invention provides a method and apparatus for password re-entry. In one or more embodiments, the invention is in an environment wherein a password and data are input into the same document. In one embodiment, this environment is the Internet where a web browser displays the output of a web server in a form HTML document. When returning a password, the invention generates two unique identifiers that represent the entries in two password fields. Next, the invention reconstructs the form by including previously entered data in the new form and by substituting the two unique identifiers for the password fields. In one embodiment, the user can edit the password by modifying the unique identifier string. The original text of the password remains safely on the server. If the password is edited, the server compares the unique identifier strings re-sent in the encoded web page with the returned web page. In this way, the server detects a modified password while still maintaining the secrecy of the password.

18 Claims, 9 Drawing Sheets

PLEASE ENTER USER ID  ⌐120                               110

PLEASE ENTER OTHER DATA 125          126                    127

PLEASE ENTER PASSWORD  ⌐130        ⌐300
                                    ERROR! PLEASE
                                    FILL OUT THE
PLEASE RE-ENTER PASSWORD TO CONFIRM  FORM AGAIN

140

WEB BROWSER 100

*Fig. 3*
*Prior Art*

METHOD AND APPARATUS FOR PASSWORD RE-ENTRY

BACKGROUND OF THE INVENTION

1. Field of the Invention

The present invention relates to password re-entry.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

The Internet currently has millions of web pages that can be accessed. Some of the web pages require the input of passwords, for instance when creating or accessing a user account. Oftentimes, these passwords reside on a web page that contains other data input fields as well. It is desirable to include password entries and data input fields in the same form.

Sometimes, when errors occur, the web page must be re-transmitted to the user (if a password must be re-entered or if the other data input is incorrect in some way). In the prior art when this occurs, the web page is returned in a form that compromises the password. This problem can be better understood by first reviewing what the Internet is and how it works.

Internet

The information network known as the "Internet" has become ever increasingly popular. The Internet provides a vast body of information which may be accessed by users via computers for such purposes as business, education, and entertainment. In particular, the Internet includes a large collection of interconnected documents which are stored in computers in a system known as the World Wide Web or simply "the web". The documents are organized into web spaces, where a web space includes a home page and links to other documents which may be in the local web space or in an external web space. Such links are known as hyperlinks. Documents may include moving images, text, graphical displays, and sound.

Internet resources are typically accessed in a two-way environment via a network connection. For example, connectivity to the network may be via a conventional twisted-pair telephone line which has a relatively low data-carrying capacity (e.g., bandwidth), or via a higher bandwidth path, which may comprise optical fiber, coaxial cable, or other transmission mechanism, such as the newly emerging wireless technologies. To retrieve data from a network destination (e.g., an Internet site), a user sends a message to the network destination to request the transfer of information to the user's computer, referred to as a client. The network destination typically includes a computer known as a server. The server then sends a request signal to a source function, which may be a memory which is coupled to the server. The source function includes the user-requested information which may comprise, for example, text, graphics, audio and/or video data. In response to the request signal from the server, the source function provides the requested information to the client.

HTML

Source information which is stored in the source function is often stored in a format known as "Hypertext Markup Language (HTML)". This file or script format allows the display of text, graphics and audio information, and provides links to other pages of information through "hyperlinks." Hyperlinks are strings of characters in a particular format that specify the address of the desired page of information.

In particular, HTML is a system for marking documents to indicate how the document should be displayed, and how various documents should be linked together. HTML is a form of Standard Generalized Markup Language (SGML), defined by the International Standards Organization. HTML specifies the grammar and syntax of markup tags which are inserted into a data file to define how the data will be presented when read by a computer program known as a "web browser". Conventional web browsers include Internet Explorer, Netscape Navigator, and others.

The data file, which is typically stored on a server, includes one or more web pages which are visited by users who have computers which may run different browsers. When a page is visited, HTML data output from the server is downloaded to the client computer. The client computer's browser processes the data to format a layout for the page so the page can be viewed by the user on a computer screen. Generally, HTML tags provide text formatting, hypertext links to other pages, and links to sound and picture elements. HTML tags also define input fields for interactive web pages. Another use for HTML is to generate forms. Form HTML allows the web browser to display a plurality of locations in the web page where a user can provide input which can then be transmitted to the server. Often form HTML is useful to process such data as a user ID, a password, a user's address, and a user's phone number, for instance.

An HTML application is made available to users on the web by storing the HTML file in a directory that is accessible to a server. Such a server is typically a web server which conforms to a web browser-supported protocol known as Hypertext Transfer Protocol (HTTP). Servers that conform to other protocols such as the File Transfer Protocol (FTP) or GOPHER may also be used, but do not support interactive HTML files.

HTTP defines a set of rules that servers and browsers follow when communicating with each other. Typically, the process begins when a user accesses an icon in an HTML page which is the anchor of a hyperlink, (for instance, by positioning a cursor on the icon and depressing a mouse button), or the user inputs a Uniform Resource Locator (URL) to his or her web browser, described below. A connection is then made to the server at the address and port number specified by the URL. Next, the browser sends a request to retrieve an object from the server, or to post data to an object on the server. The server sends a response to the browser including a status code and the response data. The connection between the browser and server is then closed.

URL

A URL is a unique address which identifies virtually all files and resources on the Internet. A URL has the form:

method://server:port/path/file#anchor.

The "method" of accessing the resource is the web browser-supported protocol, and may include, for example, HTTP, FTP, GOPHER, TELNET, NEWS, or MAILTO. The "server:port" indicates the name of the server which is providing the resource, and is alternatively known as the Internet domain name. For example, many businesses will use their business name as part of the server field. The port designation is the port number on the server, but is usually not used since a default port is assumed. The "path" indicates the directory path to the resource. The file indicates the file name of the resource. The "anchor" indicates the named element in the HTML a document. Not all fields are required.

Thus, it can be seen that web browsers operate in a two-way communication environment to access information by sending a request signal defined by a URL command to a server, and receiving information in return.

Password and Data Entry

Most web pages that require a password to be entered normally require the user to enter the password twice, so that a verification can occur as to whether the user has made a typographical error. In addition, these password fields normally echo characters with a rather than the original letter, for security purposes. Thus, a person maliciously peering over the shoulder of the user will be unable to determine his or her password.

Referring to FIG. 1, web browser 100, includes display area 110 for displaying the HTML output of a web server which in this example is a form. FIG. 1 substantially represents the screen of a computer user displaying a form. In operation, the user inputs data to the form, which includes input areas for a user ID 120, other data fields 125–127, a first password field 130, and a second password field 140. After the user has completed inputting data, it will appear substantially as shown in FIG. 2. Thus, a user ID entry 200 in the user ID field 120, other data field entries, data1, data2, and data3, (205–207), in other data fields (125–127), a first password entry 210 in the first password field 130, and a second password entry 220 in the second password field 140 have been entered. First and second password entries 210 and 220 are represented as strings of "*" characters as is common in the prior art.

Take, for example, the case where a user intends his or her password to be "dog". The user is presented with two fields for password entry, such as fields 130 and 140 of FIG. 2. Assume, for instance that the user inputs "dog" into the first field instead of "dog". The user would see "***" and believe the password to be dog. Thus, in the future, the user would be unable to utilize the password because the computer would recognize the password as "dog" while the user believes the password to be "dog". With the more common two field entry, as in FIGS. 1 and 2, the computer will obviate this problem because the two differing entries will indicate that a typographical error has been made. Thus, fields 130 and 140 will display only strings of "*" characters, but by comparing the actual characters of the strings, the server will determine that an error occurred and notify the user.

Re-sending Forms

In the prior art, when an error occurs in a two field password entry, or another type of error occurs, such as an invalid user ID entry 200, or an invalid other type of data entry 205–207, one solution is for the server to re-send the form and prompt the user to fill out the form again. The re-sent page is exemplified by FIG. 3, which includes error message 300, which prompts the user to fill out the form again.

Note that all data entries from FIG. 2 have been removed from the re-sent form. While this solution does not compromise the password, it is disadvantageous because if user ID field 120, or other data fields 125–127 were entered correctly, they must be-re-entered again. This can be time consuming and unnecessarily repetitive for users, often causing them to forego filling out the form altogether. In addition, many forms are extremely detailed and could have hundreds of other field entries, many of them comprising large blocks of text. Forcing a re-entry because of a mistyped letter in a password or other data field is disadvantageous.

To avoid forcing a re-entry of the entire form, one prior art solution causes the server to construct a new HTML form document, such as the document described in connection with FIG. 4. In reconstructing the document, the server generates HTML code. The code can include the data that was correctly entered into the field, which will include the password in clear text. This code is not readily visible in FIG. 4, but HTML source code is freely available through various other techniques.

Most conventional web browsers include the functionality to view the source of an HTML document, such as by depressing view source button 400 of web browser 100. The HTML code could also be cached on the workstation and retrieved later from the cache. This is a problem because an unauthorized user accessing the cache could discover the password as re-constructed in clear text in the HTML code of the document and later maliciously use the password.

Another solution to the problem of re-sending a password in a re-constructed HTML document is to divide the data entries and the password entries into separate web pages. Thus, a data field error will cause re-sending only the data fields in the re-constructed form, while a password error can be re-turned without the password data with little cost. This solution, however, is clearly inadequate because it creates two forms that a user must fill out, which creates additional time, complexity, and is therefore disadvantageous. A method and apparatus is needed which will reconstruct a web page that includes password fields and one or more data fields when a user must re-enter the password or data fields, in a manner that does not compromise the password.

SUMMARY OF THE INVENTION

The present invention provides a method and apparatus for password re-entry. In one or more embodiments, the invention is in an environment wherein a password and data are inputted into the same document. In one embodiment, this environment is the Internet where a web browser displays the output of a web server in a form HTML document.

The invention removes the prior art risk associated with returning a web page with the password entries in clear text. When returning a password, the invention generates two unique identifiers that represent the entries in the two password fields. Next, the invention re-constructs the form by including previously entered data in the new form and by substituting the two unique identifiers for the password fields.

In one embodiment, the user can edit the password by modifying the unique identifier string. The original text of the password remains safely on the server. If the password is edited, the server compares the unique identifier strings re-sent in the encoded web page with the returned web page. In this way, the server detects a modified password while still maintaining the secrecy of the password.

BRIEF DESCRIPTION OF THE DRAWINGS

These and other features, aspects and advantages of the present invention will become better understood with regard to the following description, appended claims and accompanying drawings where:

FIG. 3 is a diagram of a conventional web browser displaying a returned document.

DETAILED DESCRIPTION OF THEE INVENTION

The invention is a method and apparatus for password re-entry. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Figure 1:
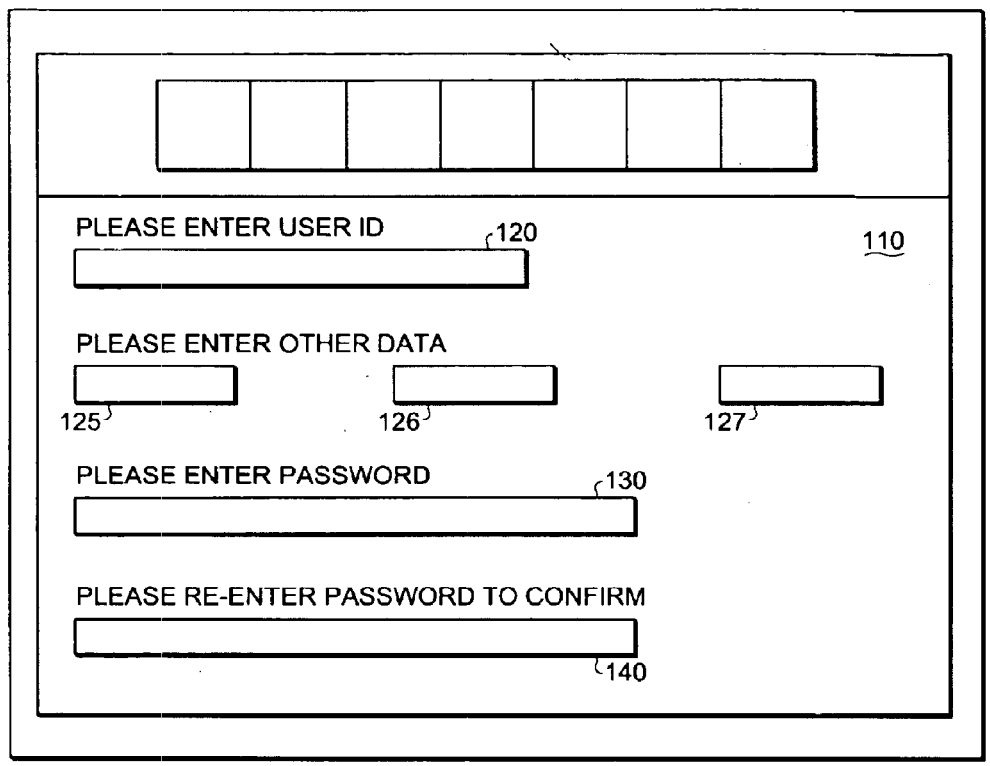
FIG. 1 is a diagram of a conventional web browser displaying a form having two password entry fields.
Figure 2:
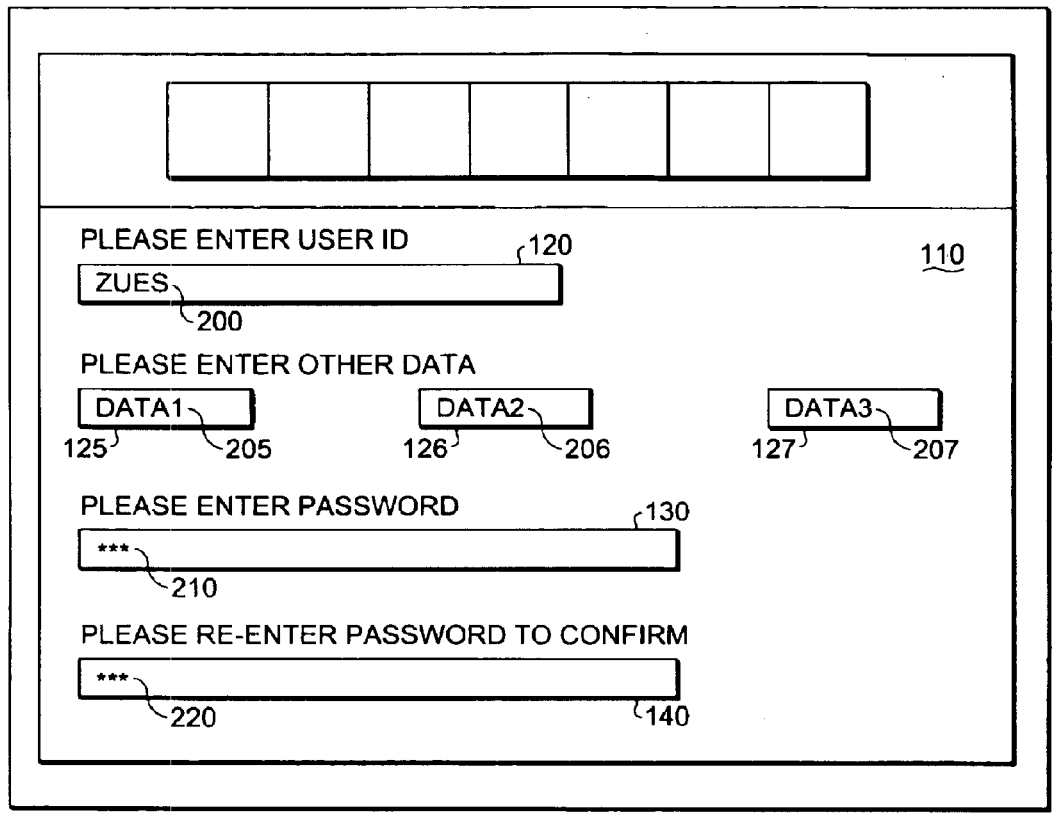
FIG. 2 is a diagram of a conventional web browser displaying a form, where the data fields have been input.
Figure 4:
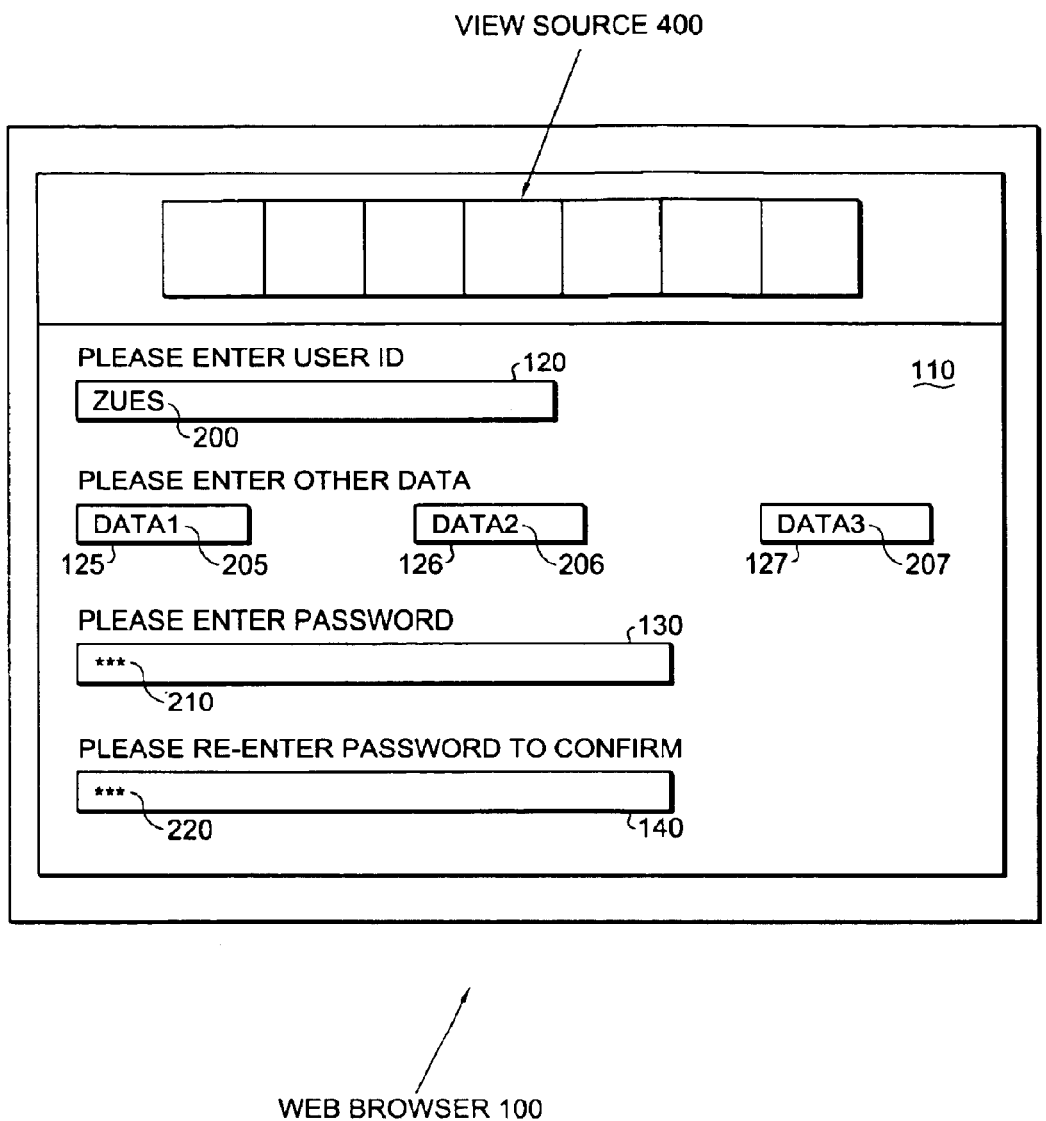
FIG. 4 is a diagram of a conventional web browser displaying a returned document having view source functionality.
Figure 5:
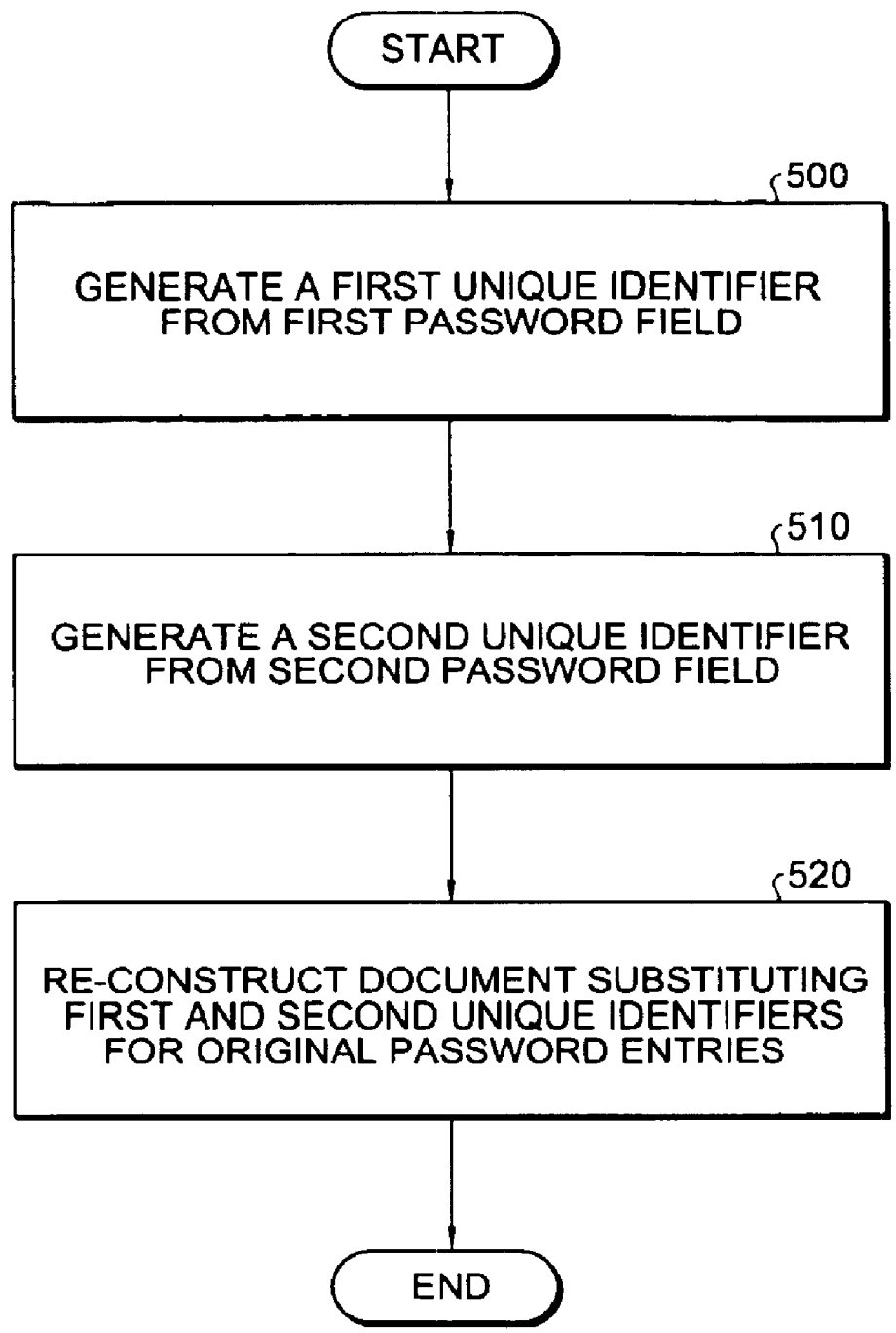
FIG. 5 is a flowchart of re-sending a form in accordance with an embodiment of the present invention.

The operation of the present invention is illustrated in FIG. 5. The operation comprises generating a first unique identifier from a first password field (step 500), generating a second unique identifier from a second password field (step 510) and re-constructing the document by substituting the first and second unique identifiers from the original password entries (step 520).

Unique Identifier Generation

With reference to steps 500 and 510 of FIG. 5, the following technique is used in one embodiment of the present invention to generate unique identifiers for the entered password fields. A string is substituted for the password. For instance, the strings "abcd" and "ABCD" can be the password field entries in the re-sent page, where the string length is the same as the original password. The re-sending of a password field encoded with a unique identifier is described in connection with FIG. 6, where encoded unique identifiers 600 and 610 are re-sent in password fields 130 and 140. Note however, that unique identifiers 600 and 610 are not limited to upper and lower case pairs. One skilled in the art will understand that any string can be used to accomplish the same purpose.

Figure 6:
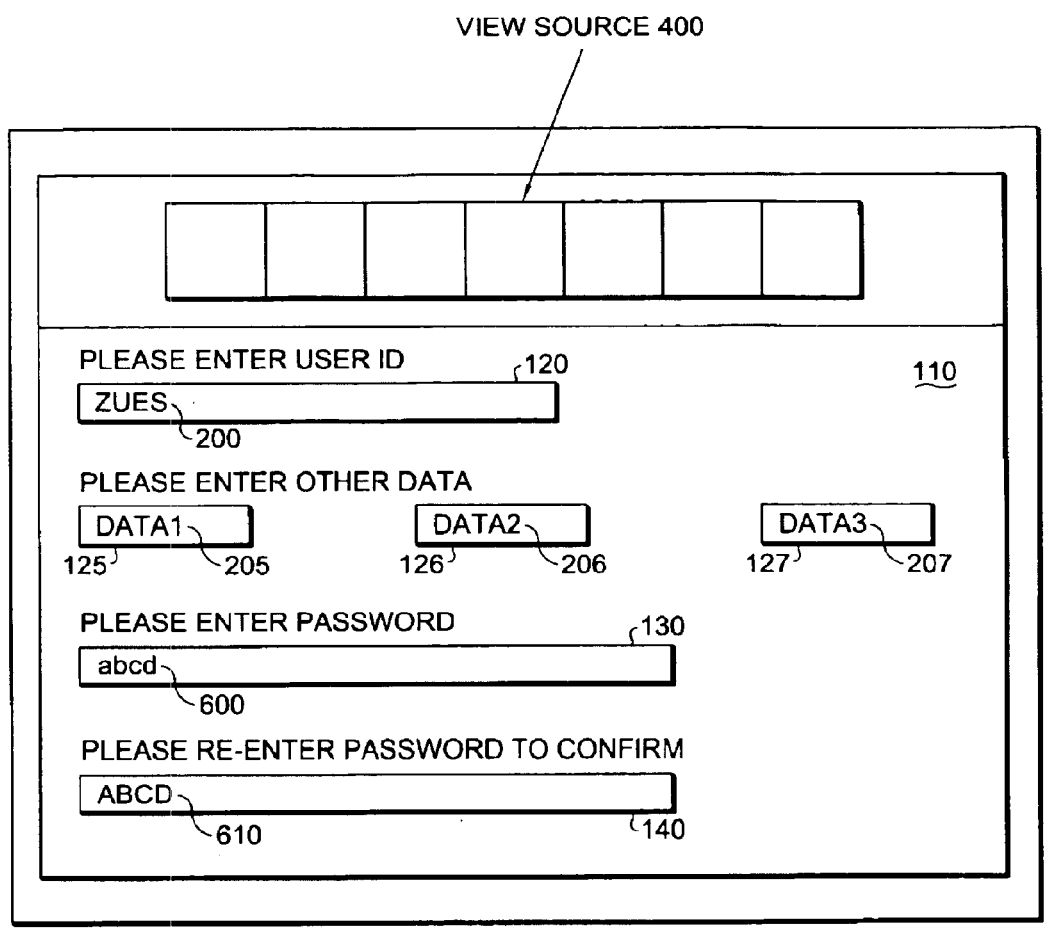
FIG. 6 is a diagram of re-sending a form in accordance with an embodiment of the present invention.

Thus, in the resent page of FIG. 6, the reconstructed text of the HTML page will contain only the strings "abcd" and "ABCD" for password fields. The un-encoded passwords remain safely on the server. If the user's error was inputting data, then the user can enter the appropriate data at this point, when presented with FIG. 6. This is accomplished without compromising the password or losing the previously entered data. When the form is returned, the re-submitted data is combined with the previously entered data.

Password Re-entry

Figure 7:
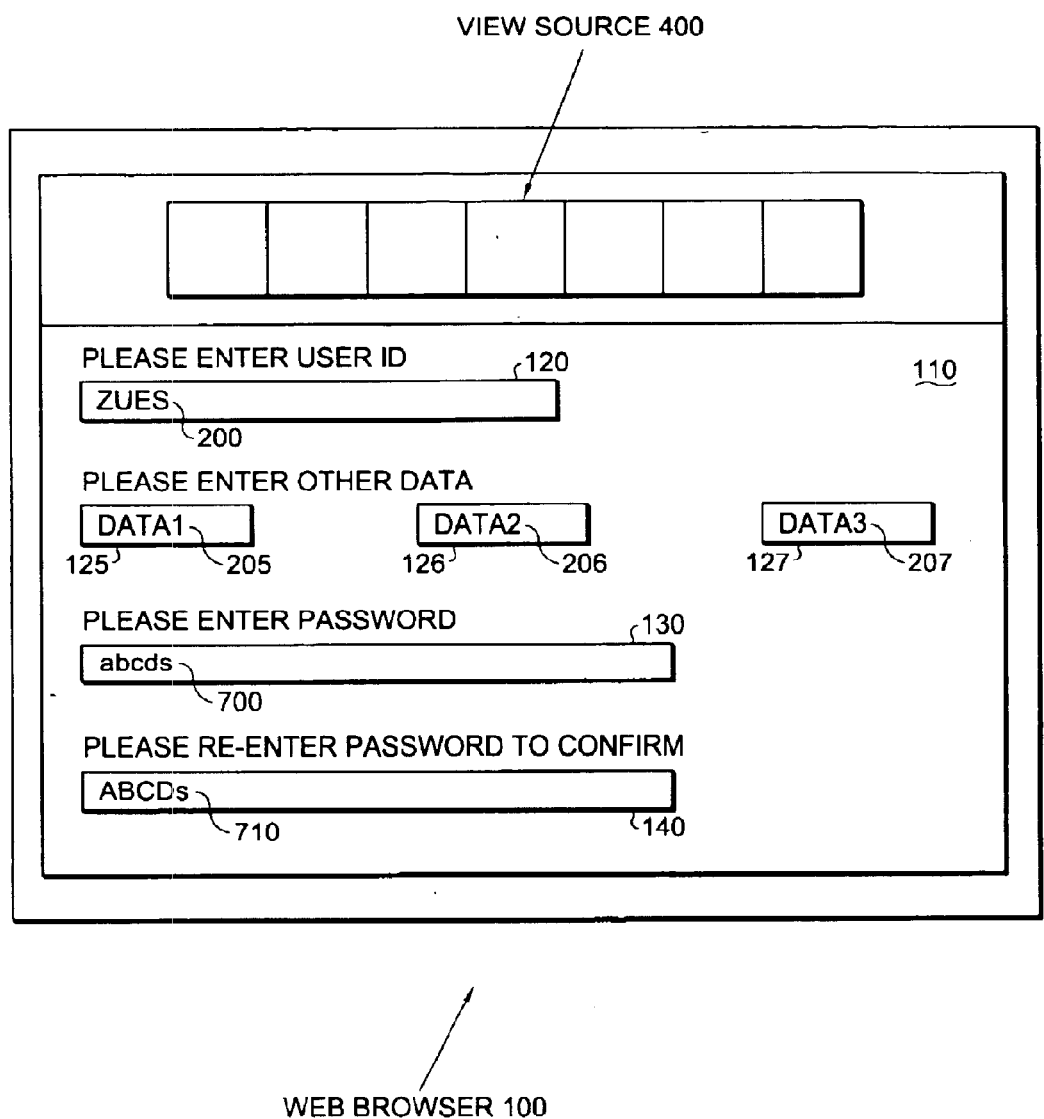
FIG. 7 is a diagram of password re-entry in accordance with an embodiment of the present invention.

In one embodiment, the re-sent form of FIG. 6 also allows the user to modify the password in a secure way. The user can change the password by adding or inserting characters into both copies of the password fields 130 and 140. Password modification is described in connection with FIG. 7. For instance, if the user had previously intended the password to be "live", then password fields 130 and 140 would originally have contained the term "live". Upon re-sending the page, the server encodes password fields 130 and 140 with the strings "abcd" and "ABCD", for example, which are the same string length as "live".

Assume at this point that the user desires to change the password to "lives". The user then would type the character "s" into fields 130 and 140 after the encoded strings 600 and 610. The re-entered password is displayed as re-entered password entries 700 and 710 of FIG. 7. After entering the new passwords, the user can re-submit the document. Upon re-submission, the server compares the password fields. By comparing the strings "abcd" and "ABCD" with re-entered password entries "abcds" 700 and "ABCDs" 710, the server will detect new or deleted characters in the password fields by comparing the position of the trace letters ("abcd . . . " and "ABCD . . . ") in the fields. Thus, the server will determine that the character "s" has been added and will change the password to "lives". Alternatively, the user may re-type the entire password, in which case the server will determine that the entire encoded string has been modified and replaced with a new password.

Figure 8:
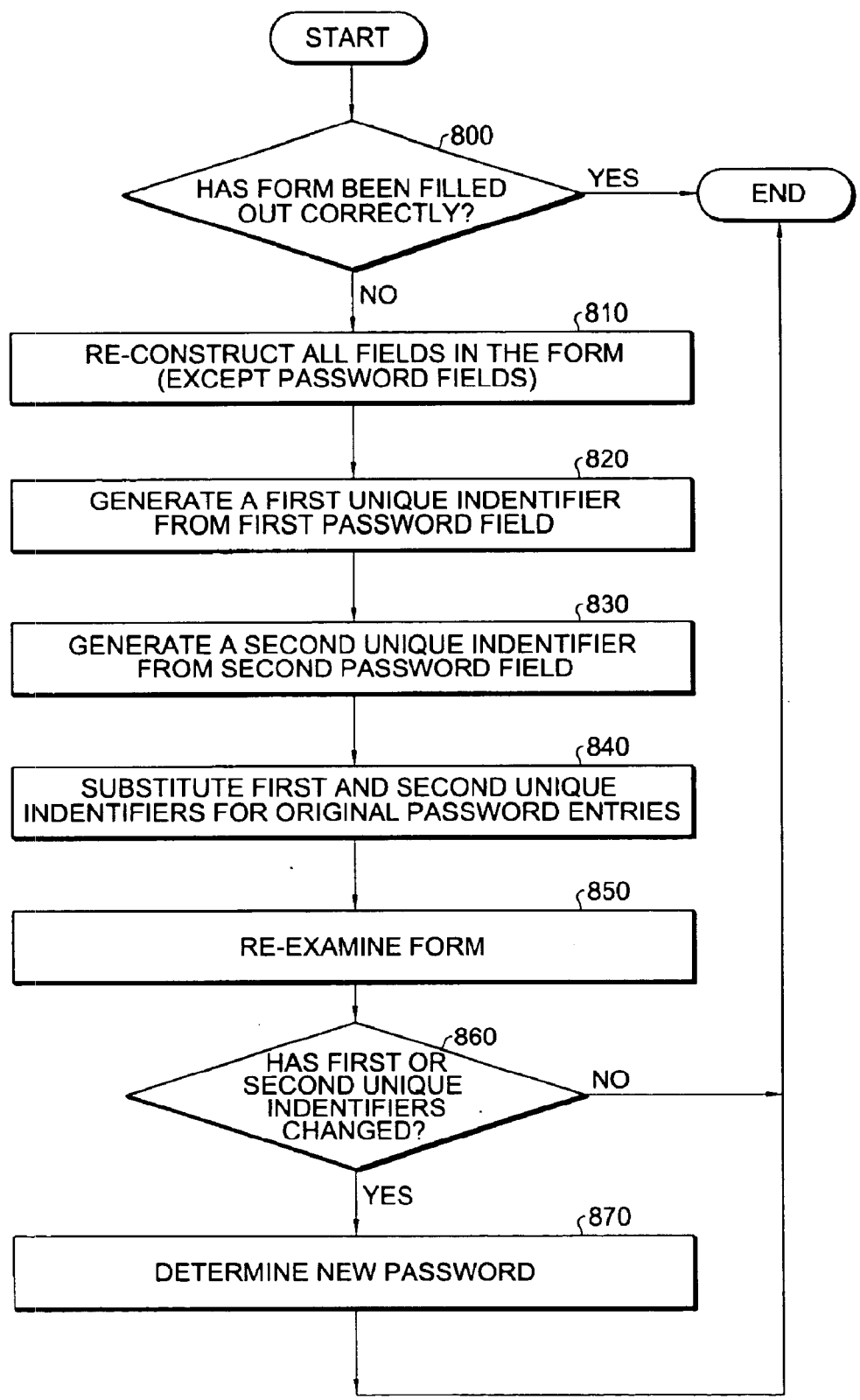
FIG. 8 is a flowchart of password re-entry in accordance with an embodiment of the present invention.

FIG. 8 is a flowchart of password re-entry in accordance with an embodiment of the present invention. At step 800, the invention determines whether the form has been correctly filled out. If the form has been correctly filled out, no further action is necessary. If the form has not correctly been filled out, the invention re-constructs all fields of the form at step 810, except the password fields. At step 820, the invention generates a first unique identifier from the first password field. At step 830, the invention generates a second unique identifier from the second password field. At step 840, the invention substitutes the first and second unique identifiers for the original password field entries. Next, the invention re-examines the form upon re-submission by the user at step 850. At step 860, the invention determines whether the unique identifiers have changed. If the unique identifiers have changed, the invention determines the new password at step 870.

Server State Maintenance

HTML is a stateless protocol. In order for a server to maintain state, (i.e., safely store the original password entered by the user), one embodiment implements a server state maintenance strategy. One embodiment of this strategy comprises the server inserting an encrypted version of the original password in a hidden field on the re-sent page. When the page is returned, the hidden encrypted password can be located, decrypted, and compared against the two unique identifiers. Sending an encrypted version of the password in a hidden field does not compromise the password since it can only be decrypted by the server that encrypted the password.

Embodiment of Computer Execution Environment (Hardware)

Figure 9:
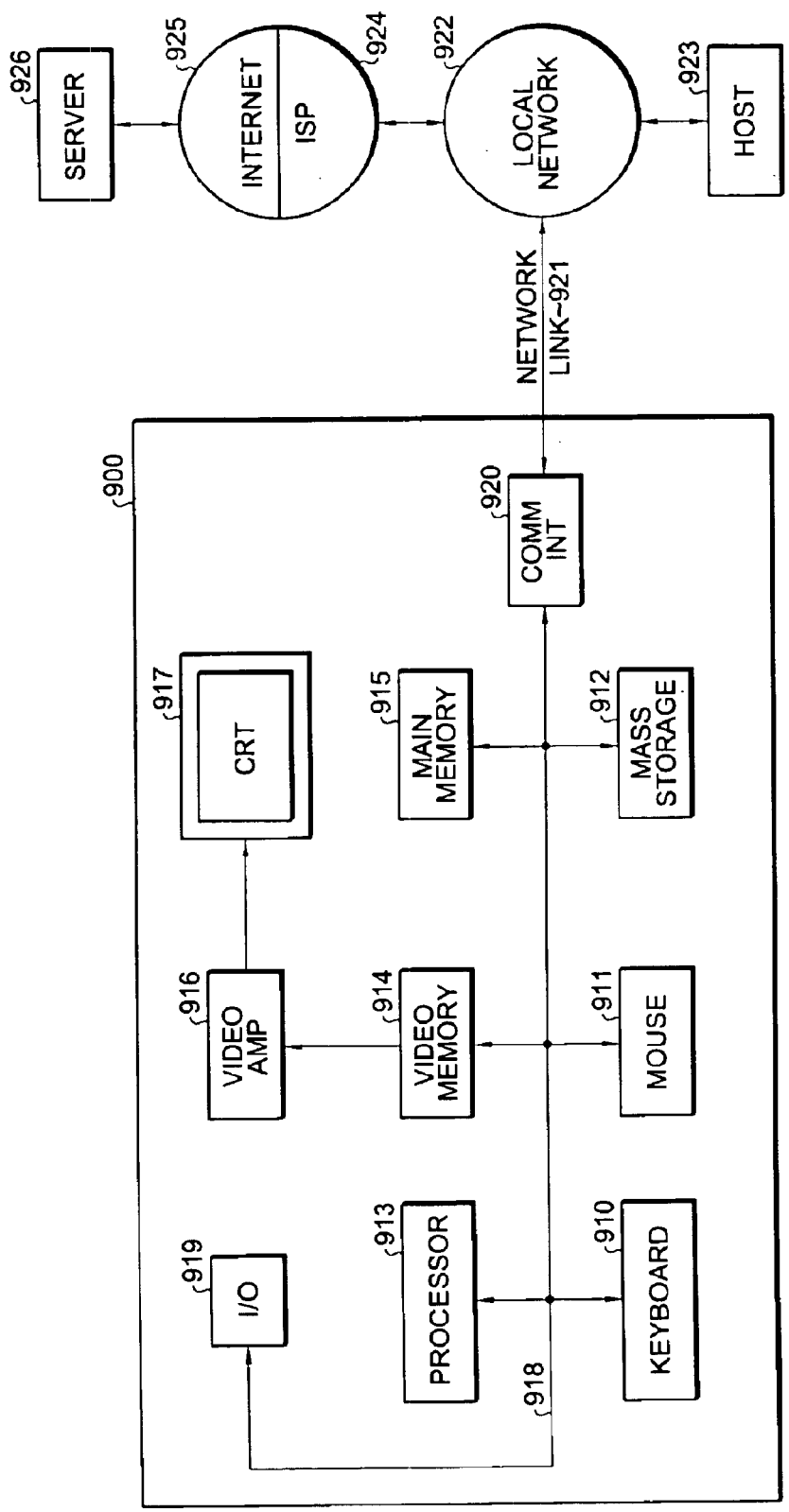
FIG. 9 is a block diagram of an embodiment of a computer system capable of providing a suitable execution environment for an embodiment of the invention.

An embodiment of the invention can be implemented as computer software in the form of computer readable code executed on a general purpose computer such as computer 900 illustrated in FIG. 9, or in the form of bytecode class files running on such a computer. A keyboard 910 and mouse 911 are coupled to a bi-directional system bus 918. The keyboard and mouse are for introducing user input to the computer system and communicating that user input to processor 913. Other suitable input devices may be used in addition to, or in place of, the mouse 911 and keyboard 910. I/O (input/output) unit 919 coupled to bi-directional system bus 918 represents such I/O elements as a printer, AN (audio/video) I/O etc.

Computer 900 includes a video memory 914, main memory 915 and mass storage 912, all coupled to bi-directional system bus 918 along with keyboard 910, mouse 911 and processor 913. The mass storage 912 may include both fixed and removable media, such as magnetic, optical or magnetic optical storage systems or any other available mass storage technology. Bus 918 may contain, for example, thirty-two address lines for addressing video memory 914 or main memory 915. The system bus 918 also includes, for example, a 32-bit data bus for transferring data between and among the components, such as processor 913, main memory 915, video memory 914 and mass storage 912. Alternatively, multiplex data/address lines may be used instead of separate data and address lines.

In one embodiment of the invention, the processor 913 is a microprocessor manufactured by Motorola, such as the 680×0 processor or a microprocessor manufactured by Intel, such as the 80×86, or Pentium processor, or a SPARC microprocessor from Sun Microsystems, Inc. However, any other suitable microprocessor or microcomputer may be utilized. Main memory 915 is comprised of dynamic random access memory (DRAM). Video memory 914 is a dual-ported video random access memory. One port of the video memory 914 is coupled to video amplifier 916. The video amplifier 916 is used to drive the cathode ray tube (CRT) raster monitor 917. Video amplifier 916 is well known in the art and may be implemented by any suitable apparatus. This circuitry converts pixel data stored in video memory 914 to a raster signal suitable for use by monitor 917. Monitor 917 is a type of monitor suitable for displaying graphic images.

Computer 900 may also include a communication interface 920 coupled to bus 918. Communication interface 920 provides a two-way data communication coupling via a network link 921 to a local network 922. For example, if communication interface 920 is an integrated services digital network (ISDN) card or a modem, communication interface 920 provides a data communication connection to the corresponding type of telephone line, which comprises part of network link 921. If communication interface 920 is a local area network (LAN) card, communication interface 920 provides a data communication connection via network link 921 to a compatible LAN. Wireless links are also possible. In any such implementation, communication interface 920 sends and receives electrical, electromagnetic or optical signals which carry digital data streams representing various types of information.

Network link 921 typically provides data communication through one or more networks to other data devices. For example, network link 921 may provide a connection through local network 922 to local server computer 923 or to data equipment operated by an Internet Service Provider (ISP) 924. ISP 924 in turn provides data communication services through the world wide packet data communication network now commonly referred to at the "Internet" 925. Local network 922 and Internet 925 both use electrical, electromagnetic or optical signals which carry digital data streams. The signals through the various networks and the signals on network link 921 and through communication interface 920, which carry the digital data to and from computer 900, are exemplary forms of carrier waves transporting the information.

Computer 900 can send messages and receive data, including program code, through the network(s), network link 921, and communication interface 920. In the Internet example, remote server computer 926 might transmit a requested code for an application program through Internet 925, ISP 924, local network 922 and communication interface 920.

The received code may be executed by processor 913 as it is received, and/or stored in mass storage 912, or other non-volatile storage for later execution. In this manner, computer 900 may obtain application code in the form of a carrier wave.

Application code may be embodied in any form of computer program product. A computer program product comprises a medium configured to store or transport computer readable code, or in which computer readable code may be embodied. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for password re-entry is described in conjunction with one or more specific embodiments. The invention is defined by the claims and their full scope of equivalents.

What is claimed is:

1. A method for re-entering a password in a document comprising:

generating a first unique identifier from a first password field in said document;

generating a second unique identifier from a second password field in said document; and generating a re-constructed document in response to a user error by replacing sold first and second password fields with said first and second unique identifiers, wherein the original text of the password remains only on a server such that the password can be modified while still maintaining the secrecy of the password and wherein said first and second unique identifiers are the some length as said first and second password fields.

2. The method of claim 1, further comprising:

examining said first and second unique identifiers to determine whether said password has changed.

3. The method of claim 2, further comprising:

modifying said first and second unique identifiers.

4. The method of claim 1, wherein said document is a HTML document.

5. The method of claim 1, wherein said document further comprises one or more data fields.

6. The method of claim 5, further comprising:

maintaining said one or more data fields in said re-constructed document.

7. A computer program product comprising:

a computer usable medium having computer readable program code embodied therein configured to renter a password in a document, said computer program product comprising:

computer readable code configured to cause a computer to generate a first unique identifier from a first password field in said document;

computer readable code configured to cause a computer to generate a second unique identifier from a second password field in said document; and computer readable code configured to cause a computer to generate a red constructed document in response to a user error by replacing said first and second password field with said first and second unique identifiers, wherein the original text of the password remains only on a server such that the password can be modified while still maintaining the secrecy of the password and wherein said first and second unique identifiers are the same length as said first and second password fields.

8. The computer program product of claim 7, further comprising:

computer readable code configured to cause a computer to examine said first and second unique identifiers to determine whether said password has changed.

9. The computer program product of claim 8, further comprising:

computer readable code configured to cause a computer to modify said first and second unique identifiers.

10. The computer program product of claim 7, wherein said document is a HTML document.

11. The computer program product of claim 7, wherein said document further comprises one or more data fields.

12. The computer program product of claim 11, further comprising:

computer readable code configured to cause a computer to maintain said one or more data fields in said re-constructed document.

13. A password re-entry apparatus for a document comprising:

a first unique identifier configured to be generated from a first password field in said document;

a second unique identifier configured to be generated from a second password field in said document; and a re-constructed document created in response to a user error configured to be generated by replacing said first and second password fields with said first and second unique identifiers, wherein the original text of the password remains only on a server such that the password can be modified while still maintaining the secrecy of the password and wherein said first and second unique identifiers are the same length as said first and second password fields.

14. The password re-entry apparatus of claim 13, further comprising:

a component which examines said first and second unique identifiers to determine whether said password has changed.

15. The apparatus of claim 14, further comprising:

a component configured to modify said first and second unique identifiers.

16. The apparatus of claim 13, wherein said document is a HTML document.

17. The apparatus of claim 13, wherein said document further comprises one or more data fields.

18. The apparatus of claim 17, further comprising:

a component configured to maintain said one or more data fields in said re-constructed document.

* * * * *

UNITED STATES PATENT AND TRADEMARK OFFICE
CERTIFICATE OF CORRECTION

PATENT NO. : 6,868,499 B1
DATED : March 15, 2005
INVENTOR(S) : John Buckle

It is certified that error appears in the above-identified patent and that said Letters Patent is hereby corrected as shown below:

<u>Column 8,</u>
Line 28, "sold" should be -- said --
Line 49, "renter" should be -- re-enter --
Line 59, "red" should be -- re-constructed --

Signed and Sealed this

Nineteenth Day of July, 2005

JON W. DUDAS
*Director of the United States Patent and Trademark Office*